United States Patent
Kazuo et al.

[11] Patent Number: 5,328,794
[45] Date of Patent: Jul. 12, 1994

[54] FLUORINE-CONTAINING GRAFT COPOLYMER AND TONER USING THE SAME

[75] Inventors: Tsubuko Kazuo; Shinichi Kuramoto, both of Numazu; Kazuhiko Umemura, Susono; Toshihiko Takahashi, Numazu; Hidemi Uematsu, Fuji, all of Japan

[73] Assignee: Ricoh Company, Ltd., Tokyo, Japan

[21] Appl. No.: 31,952

[22] Filed: Mar. 16, 1993

Related U.S. Application Data

[62] Division of Ser. No. 505,845, Apr. 6, 1990, abandoned.

[30] Foreign Application Priority Data

Apr. 12, 1989 [JP] Japan .................. 1-092107
May 10, 1989 [JP] Japan .................. 1-115117

[51] Int. Cl.$^5$ .................. G03G 9/08; C08F 265/04
[52] U.S. Cl. .................. 430/109; 430/114; 430/117; 525/74; 525/260; 525/263; 525/276; 525/286; 525/301; 525/308; 524/457; 524/763; 524/764
[58] Field of Search .......... 430/109, 114, 117; 525/74, 260, 263, 276, 286, 301, 308; 524/457, 763, 764

[56] References Cited

U.S. PATENT DOCUMENTS

| | | | |
|---|---|---|---|
| 4,087,393 | 5/1978 | Tsubuko et al. | 524/752 |
| 5,061,587 | 10/1991 | Tsubuko et al. | 430/110 |

FOREIGN PATENT DOCUMENTS

| | | | |
|---|---|---|---|
| 54-056671 | 5/1979 | Japan | 525/276 |
| 60-184513 | 9/1985 | Japan | 525/276 |
| 61-023616 | 2/1986 | Japan | 525/276 |
| 61-283607 | 12/1986 | Japan | 525/276 |
| 0260911 | 3/1990 | Japan | 525/276 |

Primary Examiner—Vasu S. Jagannathan
Attorney, Agent, or Firm—Cooper & Dunham

[57] ABSTRACT

A fluorine-containing graft copolymer prepared by a step (i) of polymerizing a monomer having formula (I) and an unsaturated carboxylic acid or a monomer having a glycidyl group to obtain a copolymer, $$CH_2=\overset{R}{\underset{A}{C}} \quad (I)$$

wherein R represents —H or —CH$_3$ group; and A represents —COOC$_n$H$_{2n+1}$ or OC$_n$H$_{2n+1}$, in which n is an integer of 6 to 20; a step (ii) of esterifying the resulting copolymer by using a monomer having a glycidyl group in the case where a constituting monomer of the above copolymer is an unsaturated carboxylic acid, or by using an unsaturated carboxylic acid in the case where a constituting monomer of the above copolymer is a monomer having a glycidyl group; and a step (iii) of graft-polymerizing a monomer comprising at least fluoroalkyl acrylate or fluoroalkyl methacrylate on the above esterified copolymer. In addition, a toner comprising a coloring agent and a resin component which comprises the above-mentioned fluorine-containing graft copolymer is disclosed.

7 Claims, No Drawings

FLUORINE-CONTAINING GRAFT COPOLYMER AND TONER USING THE SAME

This application is a division of Ser. No. 505,845, filed Apr. 6, 1990 abandoned.

BACKGROUND OF THE INVENTION

1. Field of the Invention

The present invention relates to a fluorine-containing graft copolymer, which is effective as a resin component when contained in a dry-type toner or wet-type toner for developing latent electrostatic images for use in electro-photography, and to the dry- or wet-type toner which comprises the above-mentioned fluorine-containing graft copolymer.

2. Discussion of Background

In recent years the electrophotographic technology has been applied not only to an electrophotographic copying apparatus, but also to a laser beam printer. The necessity for high-speed recording therefore becomes important in this field, so that a heat-application roller is widely used as an image fixing means because of its high-speed image fixing performance.

Furthermore, demands for image fixing performance of recorded images are diversified. For example, copied or printed images formed on a sheet of paper by the electro-photographic technology are used as direct mail advertising, which is sometimes utilized by folding an image-bearing sheet of paper. In addition, printing or copying is performed on a thick sheet such as a post card. Under such circumstances, excellent image fixing performance of toner images is necessarily required.

In Japanese Laid-Open Patent Application 50-134652, there is proposed a toner for use in an electrophotographic apparatus comprising a copolymer resin of styrene - acrylic monomer having a degree of dispersion of 3.5 to 40, which serves as a binder resin. This toner can decrease a hot off-set phenomenon in the course of image fixing operation.

In Japanese Laid-Open Patent Application 62-115170, a resin composition of a toner for use in an electrophotographic apparatus is disclosed. This resin composition is prepared by mixing copolymer resin (A) of styrene - acrylic monomer having a weight-average molecular weight of 10,000 to 30,000 and a glass transition temperature ranging from 60° C. to 70° C. and copolymer resin (B) of styrene - acrylic monomer having a weight-average molecular weight of 200,000 to 400,000 and a glass transition temperature ranging from 55° C. to 65° C. at a mixing amount ratio of 90:10 to 50:50, and the thus prepared resin composition shows a melt viscosity of 10,000 poise or less at 140° C.

In addition to the above, many proposals are made to obtain improved toners having high image fixing performance adaptable to a high-speed development mode and sufficient resistance to blocking and hot off-set phenomenon.

However, when the aforementioned conventional toners for use in an electrophotographic apparatus are used in a wet-type developer, their dispersibility is not stable in a carrier liquid such as aliphatic hydrocarbon. When used as a dry-type developer, conventional toners cannot be satisfactorily fixed on a transfer sheet if their energy for image fixing is small.

Accordingly, there are no toners which can satisfactorily show the image fixing performance without the hot off-set phenomenon in a high-speed development mode, and which have resistance to blocking and sufficient dispersibility in a carrier liquid.

With the above-mentioned problems taken into consideration, a resin component of the toner becomes the object of attention. There are conventionally known as the resin component a fluorine-containing acrylate type copolymer, a fluorine-containing polyether type copolymer, fluorine-containing urethane type oligomer and the like.

Although the above-mentioned polymers show good water and oil repellency when used in a toner, they have shortcomings in the durability, flexibility, adhesiveness which relates to the durability, and dispersibility.

As the flexibility of the conventional fluorine-containing polymers is increased, the initial performance is degraded and durability is decreased; and the fluorine-containing polymers having sufficient durability lack in flexibility.

It is difficult for conventional fluorine-containing polymers serving as a resin component in the toner to satisfy all the properties such as water- and oil-repellency, durability, flexibility, adhesiveness and dispersibility at the same time.

SUMMARY OF THE INVENTION

Accordingly, a first object of the present invention is to provide a fluorine-containing graft copolymer capable of imparting sufficient water- and oil-repellency, flexibility, durability, adhesiveness and dispersibility to a dry- or wet-type toner for use in electrophotography.

A second object of one present invention is to provide a dry- or wet-type toner for use in electrophotography, free from the conventional shortcomings, capable of attaining excellent image fixing performance to cope with high-speed development and showing high resistance to blocking and the hot off-set phenomenon.

The first object of the present invention can be achieved by a fluorine-containing graft copolymer prepared by a step (i) of polymerizing a monomer having formula (I) and an unsaturated carboxylic acid or a monomer having a glycidyl group to obtain a copolymer,

wherein R represents —H or —CH$_3$ group; and A represents —COOC$_n$H$_{2n+1}$ or OC$_n$H$_{2n+1}$, in which n is an integer of 6 to 20; a step (ii) of esterifying the resulting copolymer by using a monomer having a glycidyl group in the case where a constituting monomer of the above copolymer is an unsaturated carboxylic acid, or by using an unsaturated carboxylic acid in the case where a constituting monomer of the above copolymer is a monomer having a glycidyl group; and a step (iii) of graft-polymerizing a monomer comprising at least fluoroalkyl acrylate or fluoroalkyl methacrylate on the above esterified copolymer.

The second object of the present invention can be achieved by a dry- or wet-type toner for use in electrophotography which comprises a coloring agent and a resin component containing the above-mentioned fluorine-containing graft copolymer.

DETAILED DESCRIPTION OF THE PREFERRED EMBODIMENTS

The fluorine-containing graft copolymer according to the present invention is prepared by a step (i) of polymerizing a monomer having formula (I) and an unsaturated carboxylic acid or a monomer having a glycidyl group to obtain a copolymer,

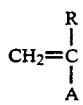 (I)

wherein R represents —H or —CH$_3$ group; and A represents —COOC$_n$H$_{2n+1}$ or OC$_n$H$_{2n+1}$, in which n is an integer of 6 to 20; a step (ii) of esterifying the resulting copolymer by using a monomer having a glycidyl group in the case where a constituting monomer of the above copolymer is an unsaturated carboxylic acid, or by using an unsaturated carboxylic acid in the case where a constituting monomer of the above copolymer is a monomer having a glycidyl group; and a step (iii) of graft-polymerizing a monomer comprising at least fluoroalkyl acrylate or fluoroalkyl methacrylate on the above esterified copolymer.

The inventors of the present invention have proposed a graft-copolymer-containing latex which is effective as a binder of a toner used in electrophotography and a coating compound as in Japanese Patent Publication 57-56940.

This graft-copolymer-containing latex is prepared by the following method:

(a) A monomer having formula (I') and a monomer having formula (II) are polymerized to obtain a copolymer;

 (I')

wherein R represents —H or —CH$_3$ group; and A represents —COOC$_n$H$_{2n+1}$ or OC$_n$H$_{2n+1}$ group, in which n is an integer of 1 to 20;

 (II)

wherein R is the same as that previously defined; and A' represents —COOH or

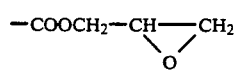

group.

(b) The above prepared copolymer is esterified by a monomer having formula (III) to obtain an esterified copolymer;

 (III)

wherein R represents —H or —CH$_3$ group; and B represents —COOH or

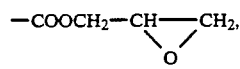

provided that B represents glycidyl methacrylate or glycidyl acrylate when an acrylic acid or a methacrylic acid is included in the above-mentioned formula (I') or (II), and B represents an acrylic acid or a methacrylic acid when glycidyl methacrylate or glycidyl acrylate is included in formula (I') or (II).

(c) A polymerizable vinyl monomer selected from the group consisting of acrylic acid and methacrylic acid, lower alkyl esters thereof having 1 to 4 carbon atoms, and a vinyl monomer such as styrene, vinyltoluene and vinyl acetate is continuously graft-polymerized on the above prepared esterified copolymer in a non-aqueous solvent such as aliphatic hydrocarbon or halogenated derivatives thereof, with application of heat thereto, and cooled to obtain a graft copolymer.

In any of the aforementioned steps (a) to (c), a wax having a softening point ranging from 60° to 130° C. or polyethylene is mixed with any reaction mixture, whereby a graft-copolymer-containing latex, which is effective as a binder of a coating compound, in particular, a coating compound for electrostatic coating, and a toner for use in the electrophotographic apparatus, is prepared.

However, the above graft-copolymer-containing latex lacks in durability and flexibility and never shows water- and oil-repellency in spite of the advantages of adhesiveness and dispersibility.

Since a monomer comprising at least fluoroalkyl acrylate or fluoroalkyl methacrylate is used in the graft polymerization step (iii) in the present invention, the water- and oil-repellency can be imparted to the above graft-copolymer-containing latex, with the excellent adhesiveness and dispersibility maintained and the durability and flexibility improved.

In the present invention, a fluorine-containing monomer may be used in the polymerization step (i) and the esterifying step (ii). To obtain the improved water- and oil-repellency and other properties, however, it is preferable that the fluorine-containing monomer be used in the final graft polymerization step (iii).

The present invention will now be explained in detail by referring to the preparing conditions and constituting materials of the fluorine-containing graft copolymer.

The polymerization reaction in the step (i) is generally carried out at 70° C. to 150° C.

It is preferable that the amount of the monomer having formula (I) to the amount of an unsaturated carboxylic acid or a monomer having a glycidyl group be in the range of about (99.9~80 wt.%) to (0.1~20 wt.%).

Examples of the monomers having formula (I) for use in the present invention are alkyl esters having 6 to 20 carbon atoms, such as lauryl acrylate, lauryl methacrylate, 2-ethylhexyl acrylate, 2-ethylhexyl methacrylate, stearyl acrylate, stearyl methacrylate, vinylstearyl acrylate and vinylstearyl methacrylate.

Examples of unsaturated carboxylic acids capable of forming a copolymer by polymerization with the above monomer of formula (I) are acrylic acid, methacrylic acid, fumaric acid, crotonic acid, itaconic acid and maleic acid.

Examples of the monomer having a glycidyl group capable of forming a copolymer by polymerization with the above monomer of formula (I) are glycidyl acrylate, glycidyl methacrylate, glycidyl propylacrylate, glycidyl propylmethacrylate, glycidyl butylacrylate and glycidyl butylmethacrylate.

Examples of polymerization initiators used in the polymerization step (i) are azobisisobutyronitrile (AIBN), benzoyl peroxide (BPO), phenylazo triphenylmethane, lauryl peroxide, di-t-butyl peroxide, t-butyl peroxide and cumene hydroperoxide.

In the presence of a polymerization initiator the polymerization can be carried out in the polymerization solvent such as water and an organic solvent, or without polymerization solvent. For example, the above-mentioned monomer having formula (I) is allowed to react with the unsaturated carboxylic acid or the monomer containing a glycidyl group in an aliphatic hydrocarbon solvent in the presence of azobisisobutyronitrile at a temperature ranging from 70° C. to 150° C.

The esterification reaction in the step (ii) is generally carried out at 30° C. to 120° C.

It is preferable that the amount of an unsaturated carboxylic acid or a monomer having a glycidyl group which is employed to esterify the copolymer obtained in the step (i) be in the range of 0.1 to 20 parts by weight to 100 parts by weight of the copolymer obtained in the polymerization step (i).

The same unsaturated carboxylic acids or monomers having a glycidyl group as those employed in the polymerization step (i) can be used for the esterification reaction.

Examples of esterification catalysts used in the esterification step (ii) are pyridine and lauryldimethylamine.

For example, an unsaturated carboxylic acid or a monomer having a glycidyl group, which is the same as employed in the polymerization step (i), and the polymerization reaction solution obtained in the step (i) are mixed and heated to 30° C. to 120° C. in the presence of pyridine or lauryldimethylamine.

The copolymer obtained in the polymerization step (i) is esterified through the aforementioned esterification reaction in the step (ii), and a graft active point is formed in an esterified moiety of the copolymer. The esterified copolymer is thus obtained in such a fashion that it is dissolved in a non-aqueous solvent, and becomes a backbone of a graft copolymer to be prepared in the final stage.

The graft polymerization reaction in the step (iii) is generally carried out at 70° C. to 150° C.

It is preferable that the amount of a monomer comprising at least fluoroalkyl acrylate or fluoroalkyl methacrylate be in the range of 5 to 100 parts by weight to 100 parts by weight of the esterified copolymer obtained in the esterification step (ii).

The above monomer comprising at least fluoroalkyl acrylate has a fluoroalkyl moiety represented by $CH_2CF_3$, $CH_2C_2F_5$, $CH_2C_3F_7$, $CH_2C_4F_9$, $CH_2C_5F_{11}$, $CH_2C_7F_{15}$, $CH_2C_8F_{17}$, $CH_2C_9F_{19}$ or $CH_2C_{10}F_{21}$.

The above monomer comprising at least fluoroalkyl methacrylate has a fluoroalkyl moiety represented by $CH_2CF_3$, $CH_2(CF_2CF_2)_2H$, $CH_2CH_2C_3F_7$, $(CH_2)_5C_8F_{17}$, $CH_2(CF_2CF_2)_3H$, $CH_2(CF_2CF_2)_4H$, $(CH_2)_2(CF_2)_7CF_3$ or $CH_2C_{20}F_{41}$.

Examples of graft polymerization initiators used in the graft polymerization step (iii) are benzoyl peroxide and azobisisobutyronitrile.

For example, a mixture of the monomer comprising at least fluoroalkyl acrylate or fluoroalkyl methacrylate and the esterification reaction solution obtained in the step (ii) is heated to 70° C. to 150° C. in the presence of benzoyl peroxide or azobisisobutyronitrile.

The graft copolymer of the esterified copolymer obtained in the step (ii) and the monomer comprising at least fluoroalkyl acrylate or fluoroalkyl methacrylate can be obtained. The graft portion of the thus obtained graft copolymer is insoluble in the non-aqueous solvent.

In the graft polymerization step (iii), a polymerizable vinyl monomer selected from the group consisting of alkyl esters having 1 to 4 carbon atoms of acrylic acid and methacrylic acid, that is, methyl acrylate, methyl methacrylate, ethyl acrylate, ethyl methacrylate, propyl acrylate, propyl methacrylate, butyl acrylate and butyl methacrylate can be used together with the monomer comprising at least fluoroalkyl acrylate or fluoroalkyl methacrylate.

The fluorine-containing graft copolymer according to the present invention is prepared in a solvent or without solvent, as previously mentioned.

For the solvent for use in the present invention, organic solvents or water is employed. Examples of the organic solvents are toluene; tetrahydrofuran; benzene; xylene; petroleum aliphatic hydrocarbon such as kerosine, ligroin, n-hexane, n-heptane, n-octane, i-octane and i-dodecane, including commercially available petroleum aliphatic hydrocarbon, "Isopar H", "Isopar G", "Isopar L", "Isopar K", "Naphtha No. 6" and "Solvesso 100" (Trademark), made by Exxon Chemical Japan Ltd.; halogenated aliphatic hydrocarbon such as carbon tetrachloride, perchloroethylene and perfluoroethylene; and mixtures thereof. Furthermore, the solvent can be prepared by adding a small amount of an aromatic-type solvent such as toluene and xylene to the above-mentioned aliphatic hydrocarbon type solvent.

The thus obtained fluorine-containing graft copolymer has a particle diameter of about 0.1 to 5 μm and shows good dispersion stability and adhesiveness between molecules thereof, so that it is effective as a resin component in a dry- and wet-type toner.

To further improve the dispersion stability of the above-mentioned fluorine-containing graft copolymer according to the present invention, waxes having a softening point of 60° C. to 130° C., other waxes such as low-molecular-weight polyolefin and ethylene—ethyl acrylate—maleic anhydride copolymer or polyethylene may be added to the reaction mixture in any steps (i) to (iii), preferably in the course of the step (iii). In this case, it is necessary to employ as a reaction solvent a non-aqueous solvent such as petroleum aliphatic hydrocarbon, for example, n-hexane, n-pentane, isooctane and commercially available "Isopar H", "Isopar G", "Isopar L" and "Isopar K" (Trademark), made by Exxon Chemical Japan Ltd.; or halogenated derivatives thereof, for example, carbon tetrachloride and perchloroethylene to completely dissolve the above waxes therein. The above non-aqueous solvent is heated to a predetermined temperature for the reaction. It is required to set the above temperature higher than the softening point of the employed wax to dissolve it in the non-aqueous solvent.

It is preferable that the amount of the above waxes be in the range of 5 to 50 parts by weight to 100 parts by weight of a mixture of the monomer having formula (I) and an unsaturated carboxylic acid or a monomer having a glycidyl group in the case where the waxes are employed in the polymerization step (i); also in the range of 5 to 50 parts by weight to 100 parts by weight of the polymerized copolymer in the case of the esterification step (ii); and in the range of 1 to 40 parts by weight to 100 parts by weight of the esterified copolymer in the case of the graft polymerization step (iii).

Whenever the waxes are employed, they do not take part in the reaction, so that they do not substantially affect the quality of the final non-aqueous resin product. From the viewpoints of a degree of esterification and a rate of graft polymerization, however, it is desirable that the above-mentioned waxes be added to a reaction mixture during the graft polymerization step (iii).

The reaction solution is thus obtained at a final stage. By cooling this reaction solution, a wax component which is dissolved therein separates out in finely-divided particles. While separating out in the solvent, the finely-divided particles of the aforementioned wax component adsorb the fluorine-containing graft copolymer suspended in the reaction solution. As a result, resin particles are prepared in such a fashion that finely-divided particles of the wax component, serving as a core thereof, are coated by the above-mentioned fluorine-containing graft copolymer and those resin particles are suspended in the obtained latex.

The size of the adore resin particle suspended in the latex varies depending on the of employed waxes, the concentration of the wax, and the conditions of stirring and cooling. For example, when a dilute solution of the wax at a concentration of 1% to 10% is rapidly cooled, a resultant resin particle suspended in the latex has a particle diameter of 0.1 to 0.3 μm. On the other hand, when a concentrated solution of the wax at a concentration of 20% to 50% is gradually cooled, a relatively large resin particle having a particle diameter of 0.5 to 20 μm is obtained. As is apparent from the above, rapid cooling of a dilute solution of the wax is effective to obtain finely-divided resin particles.

With the above conditions being taken into consideration, it is preferable that the softening point of the employed waxes forming a core of the resin particle be in the range of 60° C. to 130° C. Within the above range, the wax is readily dissolved in the non-aqueous solvent and the dissolved wax in the reaction solution can easily separate out by cooling.

The specific gravity of the above waxes is approximate to that of the employed non-aqueous solvent.

In the latex, as previously mentioned, the finely-divided particles of the above-mentioned wax component are coated by the fluorine-containing graft copolymer according to the present invention which are soluble or insoluble in the non-aqueous solvent. The thus obtained latex has the following characteristics:

(1) The dispersion stability of resin particles in this latex is good and coagulation does not easily occur because the specific gravity of the finely-divided particle of the wax component forming a core of the resin particle in the latex is approximate to that of the non-aqueous solvent serving as a dispersion medium. For example, even though the solid content of the latex is 1%, it is stable for 3 months or more.

(2) The resin particles in the latex are firmly adsorbed by various pigments such as titanium oxide, zinc oxide, calcium carbonate and silica.

(3) When a toner for use in electrophotography is prepared by using this latex, it is well fixed on both hydrophilic and hydrophobic surfaces such as a sheet of paper, a plastic film and a metallic plate.

(4) A desired product of the latex can be easily prepared in a short period of time in high yield.

The present invention will now be explained in detail by referring to the following preparation examples of the fluorine-containing graft copolymer.

PREPARATION EXAMPLE 1

Polymerization Step (i)

300 g of a commercially available aliphatic hydrocarbon solvent, "Isopar G" (Trademark), made by Exxon Chemical Japan. Ltd., was placed in a container equipped with a stirring mill, a thermometer and a reflux condenser and heated to 95° C.

To the above solvent, a mixture of 200 g of 2-ethylhexyl methacrylate, 10 g of glycidyl methacrylate and 3 g of azobisisobutyronitrile was added dropwise at a constant speed over a period of 3 hours, followed by stirring for 1 hour to complete the polymerization reaction. Thus, 2-ethylhexyl methacrylate - glycidyl methacrylate copolymer was obtained.

Esterification Step (ii)

To the copolymer solution obtained in the above step (i), 5 g of acrylic acid, 0.1 g of hydroquinone and 1 g of lauryl dimethylamine were added. The reaction was allowed to continue at 90° C. for 15 hours, whereby the copolymer prepared in the step (i) was esterified. It was confirmed that the degree of esterification was in the range of 25% to 30% by measuring the decrease in oxidation number.

Graft Polymerization Step (iii)

To the esterification reaction solution obtained in the above step (ii), 500 g of a commercially available aliphatic hydrocarbon solvent, "isopar G", made by Exxon Chemical Japan Ltd., was added.

To the thus obtained reaction mixture; a mixture of 50 g of fluoroacrylate having the following formula and 3 g of azobisisobutyronitrile was added dropwise at a constant speed over a period of 3 hours at 90° C. and the reaction mixture was further maintained at 90° C. for about 5 hours. Thus, a reaction product was obtained.

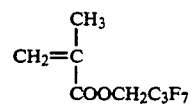

Furthermore, 300 g of "Isopar G" was added to 300 g of the above obtained reaction product and the thus obtained mixture was heated to 90° C. to undergo the polymerization reaction over a period of 3 hours. Thus, fluorine-containing graft copolymer No. 1 according to the present invention was obtained.

The thus obtains fluorine-containing graft copolymer No. 1 showed water- and oil-repellency and the following values were obtained:

| Rate of polymerization: | 93% |
| Contact angle to water: | 32° |
| Contact angle to kerosine: | 28° |

PREPARATION EXAMPLE 2

The procedure for preparation of fluorine-containing graft copolymer No. 1 employed in Preparation Example 1 was repeated except that acrylic acid used in the esterification step (ii) was replaced by maleic acid, whereby fluorine-containing graft copolymer No. 2 according to the present invention was obtained.

The thus obtains fluorine-containing graft copolymer No. 2 showed water- and oil-repellency and the following values were obtained:

| Rate of polymerization: | 92.8% |
| --- | --- |
| Contact angle to water: | 30° |
| Contact angle to kerosine: | 29° |

PREPARATION EXAMPLE 3

Polymerization Step (i)

400 g of toluene was placed in a container equipped with a stirring mill, a thermometer and a reflux condenser and heated to 95° C.

To the above solvent, a mixture of 200 g of isobutyl methacrylate, 10 g of glycidyl acrylate and 2 g of benzoyl peroxide was added dropwise at a constant speed over a period of 1 hour, followed by stirring at 95° C. for 3 hours to complete the polymerization reaction. Thus, isobutyl methacrylate - glycidyl acrylate copolymer was obtained.

Esterification Step (ii)

To the copolymer solution obtained in the above step (i), 3 g of methacrylic acid, 0.1 g of hydroquinone and 1 g of lauryl dimethylamine were added. The reaction was allowed to continue at 95° C. for 10 hours, whereby the copolymer prepared in the step (i) was esterified. It was confirmed that the degree of esterification was 30% by measuring the decrease in oxidation number.

Graft Polymerization Step (iii)

To the esterification reaction solution obtained in the above step (ii), 600 g of toluene was added.

To the thus obtained reaction mixture, a mixture of 100 g of fluoroacrylate having the following formula, 40 g of styrene and 4 g of benzoyl peroxide was added dropwise at a constant speed over a period of 3 hours at 95° C. and the reaction mixture was further maintained at 95° C. for about 5 hours. Thus, a reaction product was obtained.

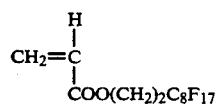

Furthermore, 200 g of toluene was added to the above obtained reaction product, and 50 g of paraffin wax having a softening point of 70° C. to 72° C. was further added thereto and dissolved therein at 95° C. The thus obtained reaction solution was cooled using tap water with stirring, whereby a latex was obtained in such a fashion that resin particles which were prepared by coating paraffin wax particles, serving as a core of the resin particle, by fluorine-containing graft copolymer No. 3 according to the present invention were suspended therein.

The thus obtained resin particles showed water- and oil-repellency and sufficient durability and adhesiveness, and the following values were obtained:

| Rate of polymerization: | 94.2% |
| --- | --- |
| Contact angle to water: | 45° |
| Contact angle to n-hexane: | 31° |

PREPARATION EXAMPLE 4

Polymerization Step (i)

400 g of a commercially available aliphatic hydrocarbon solvent, "Isopar L", made by Exxon Chemical Japan Ltd., was placed in a container equipped with a stirring mill, a thermometer and a reflux condenser and heated to 90° C.

To the above solvent, a mixture of 200 g of lauryl methacrylate, 3 g of crotonic acid and 1 g of benzoyl peroxide was added dropwise at a constant speed over a period of 2 hours, followed by stirring at 90° C. for 3 hours to complete the polymerization reaction. Thus, lauryl methacrylate - crotonic acid copolymer was obtained.

Esterification Step (ii)

To the copolymer solution obtained in the above step (i), 10 g of glycidyl methacrylate and 1 g of lauryl dimethylamine were added. The reaction was allowed to continue at 90° C. for 20 hours, whereby the copolymer prepared in the step (i) was esterified. It was confirmed that the degree of esterification was 50% by measuring the decrease in oxidation number.

Graft Polymerization Step (iii)

A mixture of the esterification reaction solution obtained in the above step (ii) and 600 g of "Isopar L" was heated to 90° C.

To the thus obtained reaction mixture, a mixture of 40 g of ethyl acrylate, 45 g of fluoromethacrylate having the following formula and 4 g of benzoyl peroxide was added dropwise at a constant speed over a period of 3 hours and the reaction mixture was further maintained at 90° C. for about 5 hours. Thus, a reaction product was obtained.

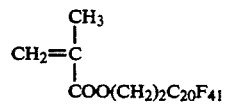

Furthermore, 200 g of "Isopar L" was added to 200 g of the above obtained reaction product, and 20 g of a commercially available polyethylene, "DYNH" (Trademark), made by Union Carbide japan K. K. having a softening point of 105° C. was further added thereto and dissolved therein at 90° C. The reaction was allowed to continue for 1 hour.

To the above obtained reaction solution, 3 g of nitrostyrene and 0.5 g of benzoyl peroxide were added to carry out the polymerization at 90° C. over a period of 4 hours, and this reaction mixture was then cooled using tap water with stirring, whereby a latex was obtained in such a fashion that resin particles which were prepared by coating polyethylene particles, serving as a core of the resin particle, by fluorine-containing graft copolymer No. 4 according to the present invention, were suspended therein.

The thus obtained resin particles showed water- and oil-repellency and the following values were obtained:

| Rate of polymerization: | 98.3% |
|---|---|
| Contact angle to water: | 69° |
| Contact angle to n-hexane: | 42° |

PREPARATION EXAMPLE 5

Polymerization Step (i)

400 g of water and 2 g of a nonionic surface active agent were placed in a container equipped with a stirring mill, a thermometer and a reflux condenser and heated to 85° C.

To the above solvent, a mixture of 200 g of 2-ethylhexyl methacrylate, 5 g of methacrylic acid and 3 g of azobisisobutyronitrile was added dropwise at a constant speed over a period of 2 hours, followed by stirring at 85° C. for 2 hours to complete the polymerization reaction. Thus, 2-ethylhexyl methacrylate - methacrylic acid copolymer was obtained.

Esterification Step (ii)

To the copolymer solution obtained in the above step (i), 5 g of glycidyl acrylate and 1 g of lauryl dimethylamine were added. The reaction was allowed to continue at 85° C. for 18 hours, whereby the copolymer prepared in the step (i) was esterified. It was confirmed that the degree of esterification was 50% by measuring the decrease in oxidation number.

Graft Polymerization Step (iii)

A mixture of the esterification reaction solution obtained in the above step (ii) and 400 g of water was heated to 90° C.

To the thus obtained reaction mixture, a mixture of 50 g of fluoromethacrylate having the following formula and 3 g of azobisisobutyronitrile was added dropwise over a period of 3 hours at 90° C. and the reaction mixture was further maintained at 90° C. for about 5 hours. Thus, a reaction product was obtained.

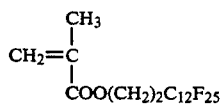

Furthermore, 200 g of water was added to 200 g of the above obtained reaction product and the thus obtained mixture was cooled. Thus, fluorine-containing graft copolymer No. 5 according to the present invention was obtained.

The thus obtaine fluorine-containing graft copolymer No. 5 showed sufficient adhesiveness, durability and flexibility, and the following values were obtained:

| Rate of polymerization: | 90.3% |
|---|---|
| Contact angle to water: | 55° |
| Contact angle to n-hexane: | 33° |

PREPARATION EXAMPLE 6

Polymerization Step (i)

300 g of isooctane was placed in a container equipped with a stirring mill, a thermometer and a reflux condenser and heated to 90° C.

To the above solvent, a mixture of 200 g of 2-ethylhexyl methacrylate, 10 g of glycidyl methacrylate and 2 g of benzoyl peroxide was added dropwise at a constant speed over a period of 2 hours, followed by stirring at 90° C. for 4 hours to complete the polymerization reaction. Thus, 2-ethylhexyl methacrylate - giycidyl methacrylate copolymer was obtained.

Esterification Step (ii)

To the copolymer solution obtained in the above step (i), 3 g of maleic acid, 0.05 g of hydroquinone and 1 g of lauryl dimethylamine were added. The reaction was allowed to continue at 90° C. for 15 hours, whereby the copolymer prepared in the step (i) was esterified. It was confirmed that the oxidation number of the reaction product was 20.

Graft Polymerization Step (iii)

To the esterification reaction solution obtained in the above step (ii), 520 g of isooctane was added.

To the thus obtained reaction mixture, a mixture of 30 g of fluoroacrylate having the following formula, 40 g of vinyltoluene and 3 g of benzoyl peroxide was added dropwise at 90° C. over a period of 3 hours and the reaction mixture was further maintained at 90° C. for about 5 hours. Thus, a reaction product was obtained.

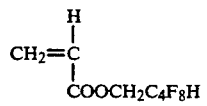

Furthermore, a mixture of 200 g of the above obtained reaction product and 200 g of isooctane was heated to 90° C., and 20 g of ethylene - ethyl acrylate - maleic anhydride copolymer (weight ratio of 98:1:1) having a softening point of 110° C. was further added thereto and dissolved therein. The reaction was allowed to continue for 1 hour and the reaction mixture was then cooled using tap water with stirring, whereby a latex was obtained in such a fashion that resin particles which were prepared by coating ethylene - ethyl acrylate - maleic anhydride copolymer particles, serving as a core of the resin particle, by fluorine-containing graft copolymer No. 6 according to the present invention, were suspended therein.

The thus obtained resin particle showed excellent adhesiveness and durability, and the following values were obtained:

| Rate of polymerization: | 96.1% |
|---|---|
| Contact angle to water: | 32° |
| Contact angle to kerosine: | 21° |

PREPARATION EXAMPLE 7

Polymerization Step (i)

300 g of a commercially available aliphatic hydrocarbon solvent, "Isopar H" (Trademark), made by Exxon Chemical Japan Ltd., was placed in a container equipped with a stirring mill, a thermometer and a reflux condenser and heated to 90° C.

To the above solvent, a mixture of 200 g of stearyl acrylate, 20 g of glycidyl methacrylate, 5 g of fluoromethacrylate having the following formula and 3 g of azobisisobutyronitrile was added dropwise at a constant speed over a period of 5 hours at 90° C. to complete the polymerization reaction. Thus, stearyl acrylate - glycidyl methacrylate - fluoromethacrylate copolymer was obtained.

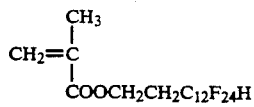

Esterification Step (ii)

To the copolymer solution obtained in the above step (i), 10 g of acrylic acid, 0.5 g of hydroquinone and 1 g of lauryl dimethylamine were added. The reaction was allowed to continue at 90° C. for 10 hours, whereby the copolymer prepared in the step (i) was esterified.

Graft Polymerization Step (iii)

To the esterification reaction solution obtained in the above step (ii), 300 g of "Isopar H" was added.

To the thus obtained reaction mixture, a mixture of 40 g of fluoromethacrylate having the same formula as above employed in the polymerization step (i), 5 g of styrene and 3 g of azobisisobutyronitrile was added dropwise over a period of 3 hours at 95° C. and the reaction mixture was further maintained at 95° C. for about 5 hours. Thus, a reaction product was obtained.

Furthermore, to 150 g of the above obtained reaction product, 200 g of "Isopar H" and 40 g of a commercially available polyethylene wax, "Sanwax 171P" (Trademark), made by Sanyo Chemical Industries, Ltd., having a softening point of 105° C. were added thereto and dissolved therein at 95° C. The reaction was allowed to continue for 1 hour.

To the thus obtained reaction solution, 10 g of hydroxyethyl methacrylate and 0.3 g of azobisisobutyronitrile were added to carry out the polymerization reaction at 95° C. over a period of 3 hours. This reaction solution was rapidly cooled with stirring, whereby a latex was obtained in such a fashion that resin particles which were prepared by coating polyethylene particles, serving as a core of the resin particle, by fluorine-containing graft copolymer No. 7 according to the present invention, were suspended therein.

The thus obtained resin particle showed excellent adhesiveness and dispersion stability, and the following values were obtained:

| Rate of polymerization: | 89.6% |
|---|---|
| Contact angle to water: | 48° |
| Contact angle to kerosine: | 35° |

The fluorine-containing graft copolymer according to the present invention is effective as a resin component of a toner when the toner is used as a dry-type developer or a wet-type developer in an electrophotographic apparatus.

More specifically, when the toner according to the present invention is used as a dry-type developer, that is, a dry-type toner without a carrier liquid, the toner according to the present invention comprises a coloring agent, the above-mentioned fluorine-containing graft copolymer serving as a binder resin, and/or finely-divided particles of a magnetic material. On the other hand, a wet-type developer can be prepared by dispersing the toner according to the present invention comprising a coloring agent and a resin component which contains the above-mentioned fluorine-containing graft copolymer in a carrier liquid.

The fluorine-containing graft copolymer according to the present invention is superior to commercially available fluorine-containing alternating copolymers and random copolymers in water- and oil-repellency and solubility in a solvent. In addition, when the toner comprising the above fluorine-containing graft copolymer as a resin component is used in an electrophotographic copying and printing apparatus in which image fixing operation is achieved by a heat-application roller, an unfixed toner image formed on a transfer sheet hardly adheres to the surface of the heat-application roller, so that the hot off-set phenomenon can be prevented. This will realize the high-speed image fixing performance.

Furthermore, the toner according to the present invention comprising the aforementioned fluorine-containing graft copolymer is superior in the blocking resistance.

The effect of water- and oil-repellency of the fluorine-containing graft copolymer according to the present invention is ascribed to its structure. More specifically, an acrylic (or methacrylic) ester polymer or copolymer of the fluorine-containing graft copolymer, corresponding to the backbone thereof, shows good compatibility with coloring agent particles. Fluorine molecules of the above graft copolymer are thus arranged on the surface of the coloring agent, so that the effect of water- and oil-repellency of the fluorine-containing graft copolymer according to the present invention becomes distinct. In the case of commercially available fluorine-containing alternating copolymers and random copolymers, on the other hand, fluorine molecules cannot be sufficiently arranged on the surface of the coloring agent, with the result that the water- and oil-repellency effect is not obtained.

As previously mentioned, when used as a dry-type developer, the toner according to the present invention comprises a coloring agent, a resin component which contains the aforementioned fluorine-containing graft copolymer, and/or finely-divided particles of a magnetic material.

Examples of the coloring agent for use in the present invention are carbon black, nigrosine dye, aniline blue, Alkali Yellow, chrome yellow, ultramarine blue, Du Pont Oil Red, Quinoline Yellow, Malachite Green Oxalate, lamp black and Rose Bengale. The above-mentioned conventional coloring agents can be used alone or in combination.

It is preferable that the amount of the coloring agent be in the range of 3 to 50 wt.% of the total amount of the toner. The amount ratio of the coloring agent, which varies depending on the materials of constituting components of the toner, is not limited to the above range.

For finely-divided particles of the magnetic material contained in the dry-type toner, ferrite and magnetite can be used. It is preferable that the amount of the magnetic material be in the range of 2.0 to 60 wt.% of the total amount of the toner. When the magnetic material and the coloring agent are used in combination, it is preferable that the amount of the coloring agent be in the range of 10 wt.% or less of the total amount of the toner.

When the toner according to the present invention is used as a wet-type developer, the following components can be employed:

The same coloring agents as mentioned in the dry-type developer are available.

As the carrier liquid for the wet-type developer, the above-mentioned non-aqueous solvents which are used for the preparation of the fluorine-containing graft copolymer, in particular, petroleum type aliphatic hydrocarbon solvents can be employed. In any case, the coloring agent is preferably coated by the fluorine-containing graft copolymer according to the present invention in the wet-type developer. When the coloring agent is not coated by the fluorine-containing graft copolymer, this graft copolymer functions as a binder resin.

To prepare the dry-type toner according to the present invention, a mixture of a fluorine-containing graft copolymer according to the present invention, a coloring agnet and/or magnetic particles, and auxiliary additives such as a fixing promoting agent (or a hot off-set inhibitor), a chargeability controlling agent and a binder resin when necessary is kneaded and pulverized until a desired particle diameter is obtained.

In the present invention, to knead the above mixture of toner formulation, it is desirable that a mechanical shear force be applied to the mixture, with the resin component contained in the mixture being melted by application of heat thereto. For example, the above mixture of toner formulation may be passed through two heat-application rolls; the mixture may be stirred and mixed in a heated screw; or the mixture in a fused state may be extruded from a small orifice under application of pressure thereto. Those methods for kneading the toner formulations are not limited as far as the aforementioned kneading effect can be obtained.

The toner formulations are thus appropriately kneaded under application of heat thereto, and then pulverized by conventional methods until the average particle diameter of a toner particle will attain to about 5 to 30 μm. The conventional mechanical pulverizing methods using, for example, a hammer mill and a jet mill are applicable.

Examples of the fixing promoting agent or hot off-set inhibitor for use in the present invention are esters of rosin, derivatives of amides, waxes such as paraffin wax, castor wax and carnauba wax and ionomer resin.

Examples of the chargeability controlling agent are a commercially available product, "Oil Black BY" (Trademark), made by Orient Chemical Industries, Ltd., alkali blue and nigrosine.

Examples of the binder resin are polyolefin, styrene - acrylic acid copolymer and rosin modified maleic acid resin.

When a wet-type developer is prepared by using the toner according to the present invention, a mixture of a coloring agent, the above-mentioned fluorine-containing graft copolymer, and a dispersing agent and other binder resins when necessary is placed together with a small amount of a carrier liquid in a dispersion mixer such as an attritor and a ball mill. This mixture is thus dispersed over a period of 24 to 30 hours to obtain toner particles having a particle diameter of about 0.1 μm to 2 μm.

Particularly, in the case where the coloring agent is employed in such a fashion that it is coated by the above-mentioned fluorine-containing graft copolymer, a mixture of the coloring agent, the fluorine-containing graft copolymer according to the present invention, and a binder resin when necessary is kneaded with application of heat thereto and then pulverized, whereby a resin-coated coloring agent can be obtained. The thus obtained resin-coated coloring agent is dispersed in the carrier liquid together with a binder resin.

In the above case, specific examples of the binder resin by which the coloring agent is coated are ethylene - maleic acid copolymer, ethylene - ethyl acrylate - methacrylate copolymer, ethylene - ethyl acrylate - acrylic acid copolymer, propylene - methyl acrylate copolymer and ethylene - ethyl acrylate - maleic anhydride copolymer.

Specific examples of the binder resin which is used together with the coloring agent when dispersed in the carrier liquid are lauryl methacrylate - glycidyl methacrylate copolymer and 2-ethylhexyl methacrylate - dimethylaminoethyl methacrylate copolymer.

Other features of this invention will become apparent in the course of the following description of exemplary embodiments, which are given for illustration of the invention and are not intended to be limiting thereof.

EXAMPLE 1

The following components were mixed and kneaded in a kneader with application of heat thereto, so that a kneaded mixture was obtained. The thus obtained kneaded mixture was cooled to room temperature to remove toluene therefrom, roughly ground, finely pulverized in a jet mill, and then classified, whereby toner No. 1 having a particle diameter of 5 μm to 25 μm according to the present invention was prepared.

|  | Parts by Weight |
|---|---|
| Fluorine-containing graft copolymer No. 1 prepared in Preparation Example 1 | 80 |
| Commercially available chargeability controlling agent "Oil Black BY" (Trademark) made by Orient Chemical Industries, Ltd. | 2 |
| Commercially available carbon black "Mitsubishi Carbon #44" (Trademark) made by Mitsubishi Carbon Co. | 15 |
| Commercially available polypropylene "Viscol 550P" (Trademark) made by Sanyo Chemical Industries, Ltd. | 3 |
| Toluene | 80 |

The above prepared toner was mixed with commercially available iron oxide carrier particles, "EFV202/300" (Trademark), made by Nihon Teppun Co., Ltd., whereby a dry-type developer having a toner concentration of 5% was obtained.

Using the above obtained dry-type developer, image formation was carried out by a commercially available electrophotographic copying machine, "SF-75" (Trademark), made by Sharp Corporation. The thus formed images were fixed by the oilless-Teflon-roll image fixing method under the conditions that a linear pressure was set to 0.5 kg/cm, a nip width to 4 mm and a paper feeding velocity to 80 mm/sec, with the temperature of the heat-application roll being changed. In the aforementioned manner, the hot off-set resistance of the toner No. 1 was evaluated. The results are given in Table 1.

To evaluate the blocking resistance of the toner, the toner was allowed to stand at 50° C. for 7 days and the state of the toner was visually inspected. The results are also given in Table 1.

COMPARATIVE EXAMPLE 1

The procedure for preparation of the dry-type developer employed in Example 1 was repeated except that the fluorine-containing graft copolymer No. 1 in the formulation of the toner used in Example 1 was replaced by a random copolymer having the same basic unit as in the above fluorine-containing graft copolymer No. 1, whereby a comparative dry-type developer was obtained.

The blocking resistance and hot off-set resistance of the thus obtained comparative dry-type developer were evaluated in the same manner as employed in Example 1. The results are given in Table 1.

EXAMPLE 2

The procedure for preparation of the dry-type developer employed in Example 1 was repeated except that 80 parts by weight of the fluorine-containing graft copolymer No. 1 in the formulation of the toner used in Example 1 were replaced by a mixture of 50 parts by weight of the fluorine-containing graft copolymer No. 2 prepared in Preparation Example 2 and 30 parts by weight of styrene - acrylic acid copolymer, whereby a dry-type developer was obtained.

The blocking resistance and hot off-set resistance of the thus obtained dry-type developer were evaluated in the same manner as employed in Example 1. The results are given in Table 1.

COMPARATIVE EXAMPLE 2

The procedure for preparation of the dry-type developer employed in Example 2 was repeated except that the fluorine-containing graft copolymer No. 2 in the formulation of the toner used in Example 2 was replaced by a fluorine-containing random copolymer having the same basic unit as in the above fluorine-containing graft copolymer No. 2, whereby a comparative dry-type developer was obtained.

The blocking resistance and hot off-set resistance of the thus obtained comparative dry-type developer were evaluated in the same manner as employed in Example 1. The results are given in Table 1.

EXAMPLE 3

The procedure for preparation of the dry-type developer employed in Example 1 was repeated except that 80 parts by weight of the fluorine-containing graft copolymer No. 1 in the formulation of the toner used in Example 1 were replaced by a mixture of 30 parts by weight of the fluorine-containing graft copolymer No. 3 prepared in Preparation Example 3 and 50 parts by weight of rosin modified maleic acid resin, whereby a dry-type developer was obtained.

The blocking resistance and hot off-set resistance of the thus obtained dry-type developer were evaluated in the same manner as employed in Example 1. The results are given in Table 1.

COMPARATIVE EXAMPLE 3

The procedure for preparation of the dry-type developer employed in Example 3 was repeated except that the fluorine-containing graft copolymer No. 3 in the formulation of the toner used in Example 3 was replaced by a fluorine-containing random copolymer having the same basic unit as in the above fluorine-containing graft copolymer No. 3, whereby a comparative dry-type developer was obtained.

The blocking resistance and hot off-set resistance of the thus obtained comparative dry-type developer were evaluated in the same manner as employed in Example 1. The results are given in Table 1.

TABLE 1

| | Resin Component of Toner Formulation | Blocking Resistance () | Hot Off-set Resistance (*) |
|---|---|---|---|
| Example 1 | Fluorine-containing graft copolymer No. 1: 80(*) Polypropylene: 3 | o | 182° C. |
| Comparative Example 1 | Fluorine-containing random copolymer: 80 | Δ | 160° C. |
| Example 2 | Fluorine-containing graft copolymer No 2: 50 Styrene-acrylic acid copolymer: 30 | o | 188° C. |
| Comparative Example 2 | Fluorine-containing random copolymer: 50 Styrene-acrylic acid copolymer: 30 | x | 162° C. |
| Example 3 | Fluorine-containing graft copolymer No. 3: 30 Rosin-modified maleic acid resin: 50 | o | 188° C. |
| Comparative Example 3 | Fluorine-containing random copolymer: 30 Rosin-modified maleic acid resin: 50 | x | 128° C. |

(*) The unit is "parts by weight".
(**) o - There is no blocking tendency.
Δ - There is a slight blocking tendency.
x - There is a marked blocking tendency.
(***) A minimum temperature where the hot off-set occurred.

EXAMPLE 4

The following components were mixed and dispersed in an attritor for 10 hours, whereby a wet-type developer having a particle diameter of 0.5 μm for use in the present invention was prepared.

| | Parts by Weight |
|---|---|
| Fluorine-containing graft copolymer No. 4 prepared in Preparation Example 4 | 100 |
| Commercially available carbon black "Mitsubishi Carbon #44" (Trademark) made by Mitsubishi Carbon Co. | 100 |
| Commercially available solvent "Isopar H" (Trademark) made by Exxon Chemical Japan Ltd. | 500 |

Using the above obtained wet-type developer, images were formed on a transfer sheet. The thus formed images were fixed by using a heat-application roller having a surface temperature of 100° C. to 138° C.

As a result, the hot off-set phenomenon was not observed and images were clearly fixed on the transfer sheet.

COMPARATIVE EXAMPLE 4

The procedure for preparation of the wet-type developer employed in Example 4 was repeated except that the fluorine-containing graft copolymer No. 4 used in Example 4 was replaced by a fluorine-containing random copolymer having the same basic unit as in the above fluorine-containing graft copolymer No. 4, whereby a comparative wet-type developer was obtained.

The hot off-set resistance of the thus obtained comparative wet-type developer was evaluated in the same manner as employed in Example 4.

As a result, the hot off-set phenomenon occurred in the course of the image fixing operation by the heat-application roller.

EXAMPLE 5

Preparation of Coloring Agent (A)

The following components were mixed and kneaded in a gallon kneader at 120° C. for 2 hours:

|  | Parts by Weight |
| --- | --- |
| Commercially available carbon black "MA-11" (Trademark) made by Mitsubishi Carbon Co. | 400 |
| Ethylene-maleic anhydride copolymer (98:2) | 500 |

To the thus kneaded mixture, 160 parts by weight of the fluorine-containing graft copolymer No. 5 prepared in Preparation Example 5 were added. The thus obtained mixture was further kneaded at 120° C. for 1 hour, so that a resin-coated coloring agent was obtained. The thus obtained resin-coated coloring agent was pulverized until the particle diameter thereof attained to 2 mm or less, whereby coloring agent (A) for use in a wet-type developer was prepared in such a fashion that the particle of the coloring agent (A) was coated by the fluorine-containing graft copolymer No. 5 according to the present invention.

Preparation of Wet-type Developer

The following components were mixed and dispersed in an attritor at 40° C. for 40 hours, whereby a wet-type developer for use in the present invention was obtained.

|  | Part by Weight |
| --- | --- |
| Coloring agent (A) | 100 |
| Lauryl methacrylate-glycidyl methacrylate copolymer (weight ratio of 90:10) | 150 |
| Commercially available solvent "Isopar L" (Trademark) made by Exxon Chemical Japan Ltd. | 500 |

Using the above obtained wet-type developer, images were formed on a transfer sheet. The thus formed images were fixed by using a heat-application roller having a surface temperature of 125° C. to 145° C.

As a result, the not off-set phenomenon was not observed and images were clearly fixed on the transfer sheet.

COMPARATIVE EXAMPLE 5

The procedure for preparation of the wet-type developer employed in Example 5 was repeated except that the fluorine-containing graft copolymer No. 5 in the formulation of the coloring agent (A) in Example 5 was not employed, whereby a comparative wet-type developer was obtained.

The hot off-set resistance of the thus obtained comparative wet-type developer was evaluated in the same manner as employed in Example 5.

As a result, the hot off-set phenomenon occurred slightly in the course of the image fixing operation by the heat-application roller.

EXAMPLE 6

Preparation of Coloring Agent (B)

The following components were mixed and dispersed in a kneader at 25° C., so that a water-containing carbon paste was prepared:

|  | Parts by Weight |
| --- | --- |
| Commercially available carbon black "Reagal #400" (Trademark) made by Cabot Corporation. | 400 |
| Ammonium salt of humic acid | 10 |
| Water | 500 |

A mixture of the following components was mixed with the above prepared water-containing carbon paste over a period of about 1 hour, and kneaded together at 130° C. for 2 hours:

|  | Parts by Weight |
| --- | --- |
| Ethylene-ethyl acrylate-methacrylic acid copolymer (60:35:5) | 700 |
| Fluorine-containing graft copolymer No. 6 prepared in Preparation Example 6 | 200 |

The thus kneaded mixture was subjected to flushing to separate a water component therefrom and further kneaded at 120° C. for 2 hours. After the completion of kneading, volatiles were removed under vacuum, whereby coloring agent (B) for use in a wet-type developer was prepared.

Preparation of Wet-type Developer

The following components were mixed and dispersed in an attritor at 40° C. for 40 hours, whereby a wet-type developer for use in the present invention was obtained.

|  | Parts by Weight |
| --- | --- |
| Coloring agent (B) | 100 |
| Lauryl methacrylate-glycidyl methacrylate copolymer (weight ratio of 90:10) | 150 |
| Commercially available solvent "Isopar L" (Trademark) | 500 |

-continued

| | Parts by Weight |
|---|---|
| made by Exxon Chemical Japan Ltd. | |

Using the above obtained wet-type developer, images were formed on a transfer sheet. The thus formed images were fixed by using a heat-application roller having a surface temperature of 125° C. to 145° C.

As a result, the hot off-set phenomenon was not observed and images were clearly fixed on the transfer sheet.

COMPARATIVE EXAMPLE 6

The procedure for preparation of the wet-type developer employed in Example 6 was repeated except that the fluorine-containing graft copolymer No. 6 in the formulation of the coloring agent (B) in Example 6 was not employed, whereby a comparative wet-type developer was obtained.

The hot off-set resistance of the thus obtained comparative wet-type developer was evaluated in the same manner as employed in Example 6.

As a result, the hot off-set phenomenon occurred slightly in the course of the image fixing operation by the heat-application roller.

EXAMPLE 7

The following components were mixed and headed in a kneader with application of heat thereto, so that a kneaded mixture was obtained. The thus obtained kneaded mixture was cooled to room temperature to remove toluene therefrom, roughly ground, finely pulverized in a jet mill, and then classified, whereby toner particles having a particle diameter of 5 $\mu$m to 25 $\mu$m according to the present invention were prepared.

| | Parts by Weight |
|---|---|
| Fluorine-containing graft copolymer No. 1 prepared in Preparation Example 1 | 80 |
| Commercially available chargeability controlling agent "Oil Black BY" (Trademark) made by Orient Chemical Industries, Ltd. | 2 |
| Coloring agent (B) prepared in Example 6 | 15 |
| Commercially available polypropylene "Viscol 550P" (Trademark) made by Sanyo Chemical Industries, Ltd. | 3 |
| Toluene | 80 |

The above prepared toner particles were mixed with commercially available iron oxide carrier particles, "EFV202/300" (Trademark), made by Nihon Teppun Co., Ltd., whereby a dry-type developer for use in the present invention was obtained.

The hot off-set resistance of above obtained dry-type developer was evaluated in the same manner as employed in Example 1. As a result, the hot off-set phenomenon was first observed when the temperature of the heat-application roll reached 179° C.

To evaluate the blocking resistance of the toner, the toner was allowed to stand at 50° C. for 7 days and the state of the toner was visually inspected. As a result, there was no blocking tendency.

As mentioned previously, when the fluorine-containing graft copolymer according to the present invention is used as a resin component of a toner, the blocking resistance and hot off-set resistance of the toner are improved and clear images can be obtained.

What is claimed is:

1. A dry-type toner comprising a coloring agent, and a resin component which comprises a fluorine-containing graft copolymer prepared by a step (i) of polymerizing a monomer having formula (I) and an unsaturated carboxylic acid or an acrylic monomer having a glycidyl group to obtain a copolymer,

wherein R represents —H or —CH$_3$ group; and A represents —COOC$_n$H$_{2n+1}$ or OC$_n$H$_{2n+1}$, in which n is an integer of 6 to 20; a step (ii) of esterifying the resulting copolymer by using a monomer having a glycidyl group in the case where a constituting monomer of said copolymer is an unsaturated carboxylic acid, or by using an unsaturated carboxylic acid in the case where a constituting monomer of said copolymer is an acrylic monomer having a glycidyl group; and a step (iii) of graft-polymerizing a monomer selected from the group consisting of a monomer having fluoroalkyl acrylate and a monomer having fluoroalkyl methacrylate on said esterified copolymer.

2. The toner as claimed in claim 1, wherein the amount of said coloring agent is in the range of 3 to 50 wt.% of the total amount of said dry-type toner.

3. The toner as claimed in claim 1, further comprising finely-divided particles of a magnetic material.

4. The toner as claimed in claim 3, wherein the amount of said magnetic material is in the range of 3.0 to 60 wt.% of the total amount of said dry-type toner.

5. The toner as claimed in claim 3, wherein the amount of said coloring agent is 10 wt.% or less of the total amount of said dry-type toner.

6. A wet-type developer comprising (a) a toner component which comprises a coloring agent and a resin component which comprises a fluorine-containing graft copolymer prepared by a step (i) of polymerizing a monomer having formula (I) and an unsaturated carboxylic acid or an acrylic monomer having a glycidyl group to obtain a copolymer,

wherein R represents —H or —CH$_3$ group; and A represents —COOC$_n$H$_{2n+1}$ or OC$_n$H$_{2n+1}$, in which n is an integer of 6 to 20; a step (ii) of esterifying the resulting copolymer by using a monomer having a glycidyl group in the case where a constituting monomer of said copolymer is an unsaturated carboxylic acid, or by using an unsaturated carboxylic acid in the case where a constituting monomer of said copolymer is an acrylic monomer having a glycidyl group; and a step (iii) of graft-polymerizing a monomer selected from the group consisting of a monomer having fluoroalkyl acrylate and a monomer having fluoroalkyl methacrylate on said esterified copolymer; and (b) a carrier liquid.

7. The wet-type developer as claimed in claim 6, wherein said coloring agent is coated by said fluorine-containing graft copolymer.

* * * * *